(12) United States Patent
Barone et al.

(10) Patent No.: US 9,300,004 B2
(45) Date of Patent: Mar. 29, 2016

(54) INTEGRAL BATTERY TAB

(71) Applicant: A123 Systems, LLC, Waltham, MA (US)

(72) Inventors: Michael Barone, Waltham, MA (US); Jonah S. Myerberg, Waltham, MA (US); Nicholas Varamo, Washington, NJ (US)

(73) Assignee: A123 Systems, LLC, Waltham, MA (US)

( * ) Notice: Subject to any disclaimer, the term of this patent is extended or adjusted under 35 U.S.C. 154(b) by 199 days.

(21) Appl. No.: 13/861,455

(22) Filed: Apr. 12, 2013

(65) Prior Publication Data

US 2013/0252054 A1    Sep. 26, 2013

Related U.S. Application Data

(63) Continuation of application No. PCT/US2011/056118, filed on Oct. 13, 2011.

(60) Provisional application No. 61/393,500, filed on Oct. 15, 2010.

(51) Int. Cl.
*H01M 2/26* (2006.01)
*H01M 2/28* (2006.01)
(Continued)

(52) U.S. Cl.
CPC .......... *H01M 10/0431* (2013.01); *H01M 2/263* (2013.01); *H01M 4/70* (2013.01); *Y10T 29/49108* (2015.01)

(58) Field of Classification Search
USPC .................................. 429/234, 94, 211, 161
IPC ....................................... H01M 4/70,4/00, 4/72
See application file for complete search history.

(56) References Cited

U.S. PATENT DOCUMENTS 5,580,679 A * 12/1996 Tanaka ........................... 429/185
5,662,566 A *  9/1997 Marxrieser et al. ............... 483/1
(Continued)

FOREIGN PATENT DOCUMENTS

CN           1523700 A      8/2004
CN         100541881 C      9/2009
(Continued)

OTHER PUBLICATIONS

ISA United States Patent and Trademark Office, International Search Report Issued in Application No. PCT/US2011/056118, Feb. 13, 2012, WIPO, 2 pages.
(Continued)

*Primary Examiner* — Patrick Ryan
*Assistant Examiner* — Julian Anthony
(74) *Attorney, Agent, or Firm* — Alleman Hall McCoy Russell & Tuttle LLP (57) ABSTRACT

One aspect of the present disclosure relates to a wound electromechanical storage device assembly including a negative electrode sheet, a plurality of negative electrode tabs which are integral to and extend from the negative electrode sheet, a positive electrode sheet, a plurality of positive electrode tabs which are integral to and extend from the positive electrode sheet, and a separator sheet disposed between the negative and positive electrode sheets, wherein the negative electrode sheet, positive electrode sheet, and separator sheet are wound around a common axis to form a plurality of windings, and wherein each winding includes one negative electrode tab and one positive electrode tab.

22 Claims, 11 Drawing Sheets

(51) Int. Cl.
*H01M 4/00* (2006.01)
*H01M 6/10* (2006.01)
*H01M 4/02* (2006.01)
*H01M 4/13* (2010.01)
*H01M 4/72* (2006.01)
*H01M 10/04* (2006.01)
*H01M 4/70* (2006.01)

(56) References Cited

U.S. PATENT DOCUMENTS

| | | |
|---|---|---|
| 2002/0192548 A1 | 12/2002 | Schaefer et al. |
| 2003/0235736 A1 | 12/2003 | Lin |
| 2005/0277019 A1 | 12/2005 | Riley, Jr. et al. |
| 2006/0110658 A1 | 5/2006 | Zhu et al. |
| 2006/0147793 A1 | 7/2006 | Kim et al. |
| 2007/0154797 A1 | 7/2007 | Hyung et al. |
| 2009/0169990 A1 | 7/2009 | Gardner et al. |
| 2009/0317707 A1 | 12/2009 | Cha |
| 2010/0124694 A1* | 5/2010 | Hikata et al. .................. 429/94 |

FOREIGN PATENT DOCUMENTS

| | | |
|---|---|---|
| CN | 101582521 A | 11/2009 |
| CN | 101609904 A | 12/2009 |

OTHER PUBLICATIONS

State Intellectual Property Office of the People's Republic of China, First Office Action Issued in Chinese Patent Application No. 201180049770.X, Dec. 31, 2014, 22 pages.
State Intellectual Property Office of the People's Republic of China, Second Office Action Issued in Chinese Patent Application No. 201180049770.X, Jul. 14, 2015, 22 pages.

* cited by examiner

INTEGRAL BATTERY TAB

PRIORITY INFORMATION

This application is a continuation of and claims the benefit of priority under 35 U.S.C. §120 to PCT Patent Application No. PCT/US2011/056118, filed Oct. 13, 2011, entitled "Integral Battery Tab," which claims the benefit of priority under 35 U.S.C. §119(e) to U.S. Provisional Application No. 61/393,500, filed Oct. 15, 2010, and entitled "Integral Battery Tab," the disclosures of all of which are hereby incorporated by reference herein in their entirety.

TECHNICAL FIELD

The present disclosure relates to construction and use of electro-chemical storage units (batteries). In particular, the disclosure relates to a battery tab apparatus and methods for making and using the same.

BACKGROUND

Devices for storing and providing electrical power have been in use for a long time. Generally falling under the descriptor "battery," such devices include electro-chemical cells and collections of cells that provide an electrical potential between at least a set of terminals. The terminals can be connected to an electrical (e.g. direct current, DC) load to energize or power the load. Batteries include dry cells, wet cells (e.g. lead-acid cells), and other types of units that generally convert a chemically available electromotive force into a current.

Batteries are sometimes classified into "primary" and "secondary" types. Primary batteries are single-use units that come from a manufacturer with a limited electro-chemical capacity and are exhausted and discarded after use. Secondary batteries can be "recharged" after use, and while not infinite in their capacity, allow for repeated use of the same cell through reversing the discharge process to some extent.

To increase battery capacity, cells have been configured to take advantage of a large surface area between the anode (negative) and cathode (positive) elements of the cells. One such design involves placing many parallel plates in electrolyte solution to allow for ionic transfer between the anodes and cathodes, generally referred to as "prismatic" cells.

Another design separates planar layered sheets of anode and cathode materials with porous membranes, then rolls the layers into a roll, referred to as a "jelly roll" that provides a compact and mechanically stable battery, generally referred to as "cylindrical" cells. In rolled battery designs, multiple alternating sheets of anode, separator, and cathode materials are used as permitted by the spatial considerations of the battery, and the anode sheets are collectively connected to an anode terminal while the cathode sheets are collectively connected to a cathode terminal. The entire device is packaged in a rigid enclosure, usually a cylindrical can.

In order to provide electrical connections to the battery terminals, multiple conducting tabs typically are inserted by welding at carefully selected intervals within the structure before it is rolled up. Prior art tabbed jelly rolls having thirty windings typically have about six tabs for each of the anode and cathode. Some designs have only one tab for each of the cathode and anode. Because the tabs are welded prior to rolling, the tabs must be precisely placed and the jelly roll must be precisely wound in order to create aligned tabs in the final rolled cell.

SUMMARY

One aspect of the present disclosure relates to a wound electromechanical storage device assembly including a negative electrode sheet, a plurality of negative electrode tabs which are integral to and extend from the negative electrode sheet, a positive electrode sheet, a plurality of positive electrode tabs which are integral to and extend from the positive electrode sheet, and a separator sheet disposed between the negative and positive electrode sheets, wherein the negative electrode sheet, positive electrode sheet, and separator sheet are wound around a common axis to form a plurality of windings, and wherein each winding includes one negative electrode tab and one positive electrode tab.

In some embodiments, each of the plurality of negative electrode tabs and the plurality of positive electrode tabs are aligned. In some of the embodiments, the positive electrode sheet and the positive electrode tabs are both comprised of aluminum. In some embodiments, the negative electrode sheet and the negative electrode tabs are both comprised of copper. In some embodiments, the substantially concentric windings have a substantially cylindrical profile. In some embodiments, the substantially concentric windings have a substantially prismatic profile. In some embodiments, each tab has a width of about three mm to about eight mm and length of about 8 mm to about 25 mm. In some embodiments, each of the tabs is substantially free of electrode active material. In some embodiments, each of the tabs has a triangular or rectangular profile.

Another aspect of the disclosure relates to a method of manufacturing an electrochemical storage device, including the steps of arranging a separator sheet between a negative electrode sheet and a positive electrode sheet, wherein each of the positive and negative electrode sheets has an edge area which is substantially free of electrode active material; winding the negative electrode sheet, separator sheet, and positive electrode sheet about a common axis to form a wound assembly; and cutting each of the edge areas to form a plurality of electrode tabs wherein each winding of the coiled assembly comprises one tab for each of negative electrode sheet and positive electrode sheet.

In some embodiments, the cutting comprises ultrasonic cutting. In some embodiments, the plurality of electrode tabs are aligned. In some embodiments, each tab has a width of about three mm to about eight mm. In some embodiments, each tab has a width of about three mm to about eight mm and length of about eight mm to about 25 mm. In some embodiments, each of the edge areas has a width of about 10 mm to about 30 mm. In some embodiments, each of the edge areas has a width of about 20 mm. In some embodiments, each of the tabs has a triangular or rectangular profile. In some embodiments, the wound assembly has a cylindrical or prismatic profile.

BRIEF DESCRIPTION OF THE DRAWINGS

Various objects, features, and advantages of the present invention can be more fully appreciated with reference to the following detailed description of the invention when considered in connection with the following drawings, in which like reference numerals identify like elements. The following drawings are for the purpose of illustration only and are not intended to be limiting of the invention, the scope of which is set forth in the claims that follow.

DESCRIPTION

The following describes in detail one or more embodiments suitable for arriving at the method and apparatus described herein, and should not be taken as exhaustive, inclusive, or limiting.

The disclosed design provides a jelly roll battery that eliminates a current collector tab to foil ultrasonic weld junction. Instead, bare electrode foil is extended beyond the electrode coating of the cell. Once the jelly roll is wound, a tab profile is cut out of the exposed foil ends. This system and method allows for one or more current collector tabs per winding. Having more tabs lowers cell impedance, improves thermal transfer, and improves overall cell performance. Because the tab is integral with the electrode foil, the impedance to current flow through the tab is reduced. The tab profile can be cut out using an ultrasonic blade. These cuts exhibit excellent edge quality and inflict no noticeable damage to the cell.

Figure 1:
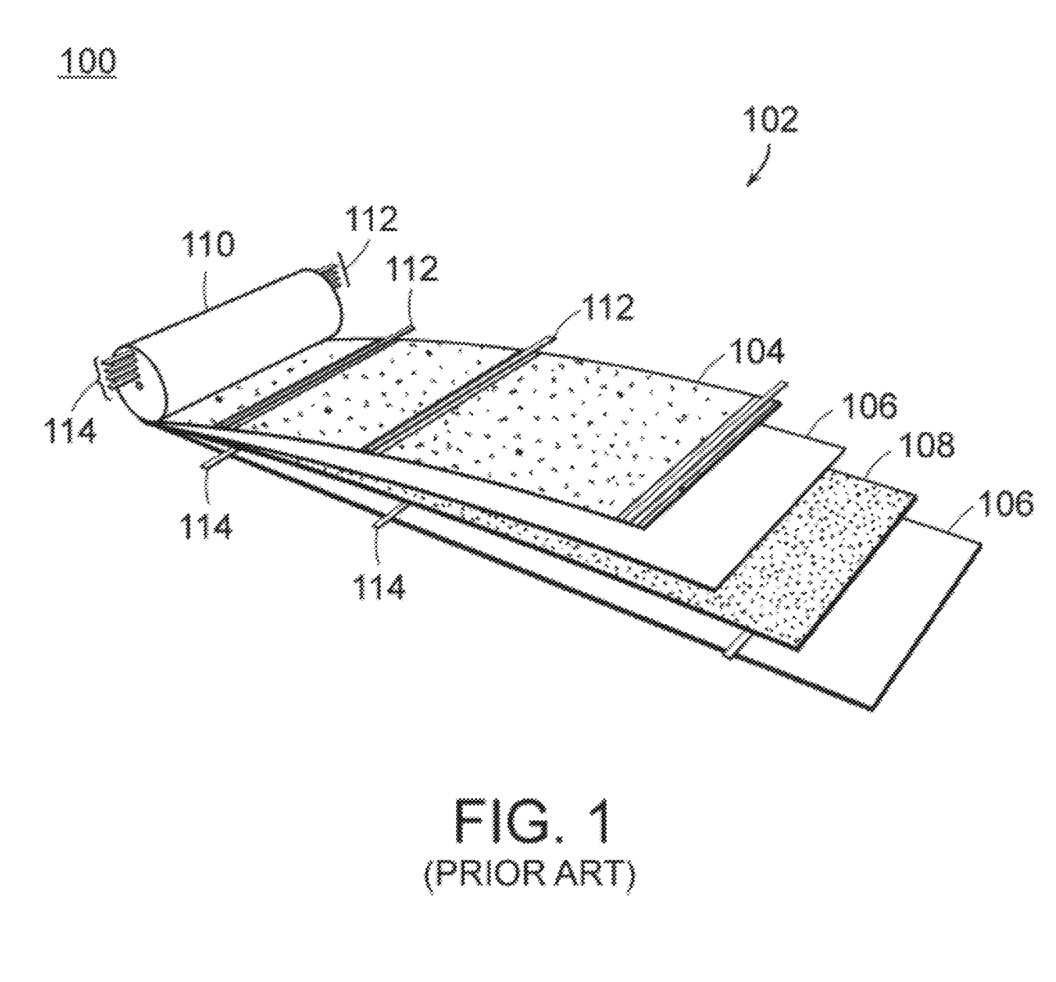
FIG. 1 illustrates a rolled electrochemical storage device according to the prior art.

Before discussing the details of the disclosed design, the following paragraphs generally describe jelly roll battery designs. FIG. 1 shows part of a battery device 100 according to the prior art. Strips or sheets of anode 104 and cathode 108 are separated by separator membranes 106. The composition of anode 104 and cathode 108 depend upon the specific type of battery, and include a layer of an electroactive material, e.g., graphite, metal, and other materials on an electrically conductive substrate or foil. The foil may serve as a current collector. In Li-ion batteries, $LiCoO_2$, $LiMn_2O_4$, $Li(Fe,Mn)PO_4$, or $(Li,Nb)(Fe,Mn)PO_4$ are typical electroactive cathode material. The separator membranes 106 are porous and allow ions to be transported between the anode 104 and cathode 108, but are electrically insulating and serve to insulate the two electrodes from one another.

Device 100 is formed by co-winding ribbon-shaped materials 104, 106, 108 into a "jelly roll" 110. To provide electrical connections to the battery terminals, multiple conducting tabs 112, 114 are inserted by welding at carefully selected intervals within the structure before it is rolled up. A first set of tabs 112 are made to contact the anode material 104 and extend outward from the rolled portion 110 on one end thereof to form the anode terminal of the battery device. A second set of tabs 114 are made to contact the cathode material 108 and extend outward from the rolled portion 110 on another end thereof to form the cathode terminal of the battery device. Prior art tabbed jelly rolls having thirty windings typically have about six tabs for each of the anode and cathode. Some designs have only one tab for each of the cathode and anode.

Figure 2A:
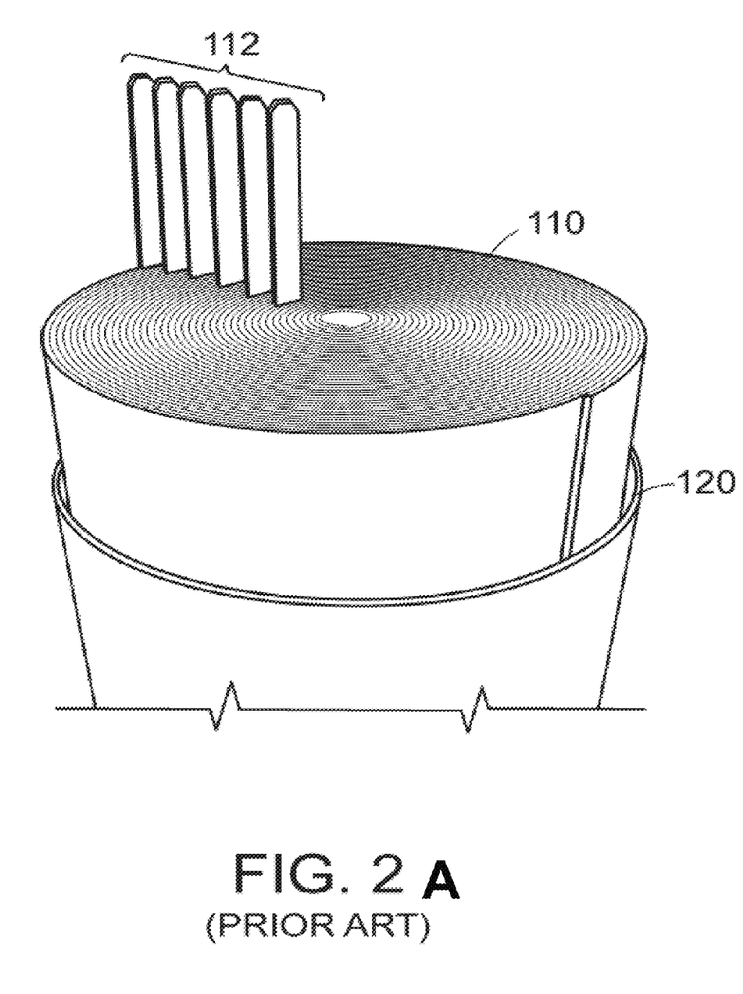
FIG. 2A illustrates one end of the rolled device of FIG. 1 with multiple tabs extending therefrom according to the prior art.
Figure 2B:
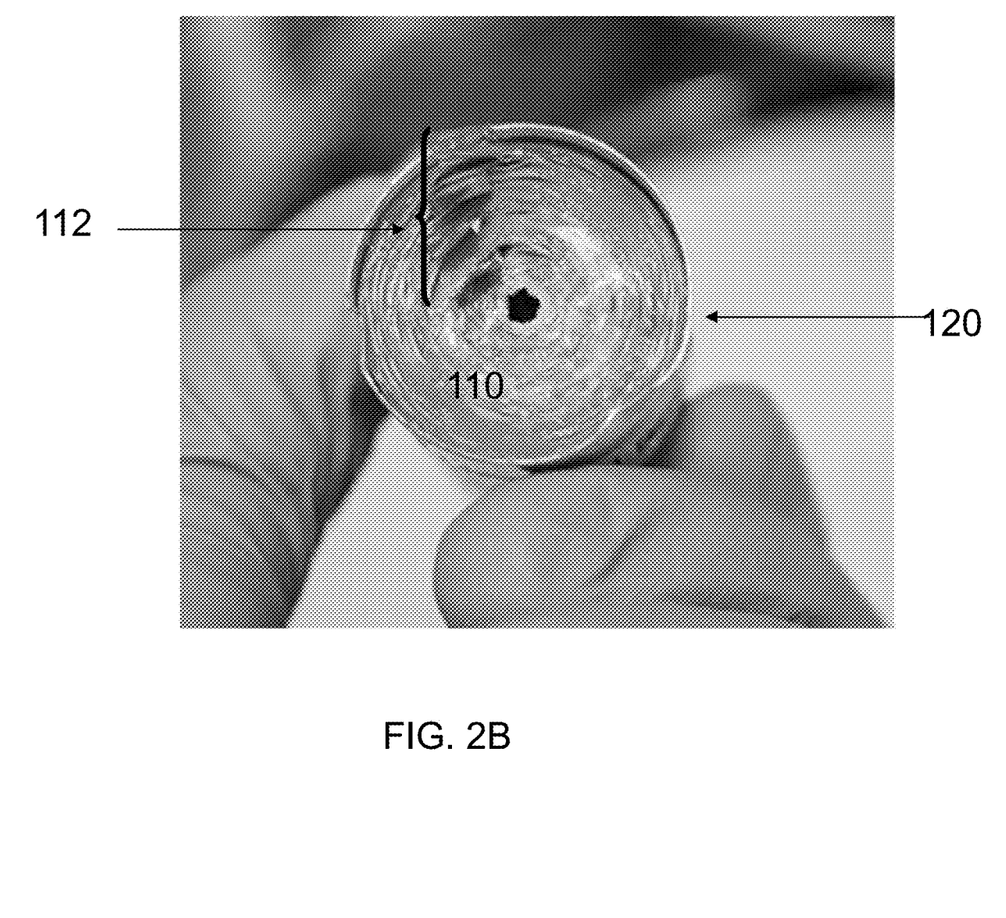
FIG. 2B is a photograph of battery device manufactured according to the prior art.

FIG. 2A illustrates an anode portion of a device according to the prior art, showing a group of six collector tabs 112 extending from the rolled portion 110 of a battery device. FIG. 2A is an idealized depiction, in practice the six collector tabs 112 are not perfectly aligned, but are often misaligned, as shown in FIG. 2B, which is a photograph of battery device manufactured according to the prior art. A can 120 houses the entire jelly roll assembly and provides the assembly with mechanical protection, prevents contamination, acts as a heat sink, and provides a cathode terminal (not shown).

The way in which the plurality of extended anode 112 and cathode 114 tabs or extensions are connected to each other and to other portions of the battery are a matter of design. Prior art designs of this aspect of rolled batteries have numerous shortcomings, some of which were discussed previously. These shortcomings include but are not limited to poor electrical properties (e.g. high impedance), poor thermal properties (poor heat dissipation), and poor mechanical and manufacturing properties. Typically, tabs 112 are ultrasonically welded to either the cathode 114 or the anode 112. The ultrasonic welding process is expensive and complicated and requires present manufacturing challenges. For example, alignment of the welded tabs in the rolled jelly roll has proven to be a difficult task. In order for the tabs to align, each tab must be precisely welded to the electrode and the roll itself must be precisely wound. For these reasons, it has been difficult to successfully align more than about six tabs in prior art systems. Ohmic resistance within the cell is created by opposing flows of electrons making their way around the winds of the jelly roll from the anode and cathode to eventually exit the cell via a current collector tab. The larger the distance between current collector tabs, the farther distance electrons must travel to move in or out of the cell. Thus, the jelly roll preferably has one tab per winding to reduce impedance and increase heat dissipation. However, limitations of the manufacturing process have resulted in less than ideal number of tabs resulting in expensive, complicated manufacturing processes that result in cells with poor thermal and electrical performance.

To address this problem, attempts were made to produce electrodes having braided copper and aluminum strips on one edge. This was an attempt to produce one continuous pathway for electrons to flow in and out of the cell with an infinite amount of tabs, thereby lowering impedance. However, this design had issues with adhesion of the braid to the electrode foil.

The present method and system, extend the foil substrates on the anode and cathode about 15 mm to about 25 mm or about 20 mm beyond the electrode coating and then cutting out a tab profile from the wound jelly roll. As discussed above, impedance is reduced by shortening the distance that electrons must travel to enter or exit the cell.

Figure 3:
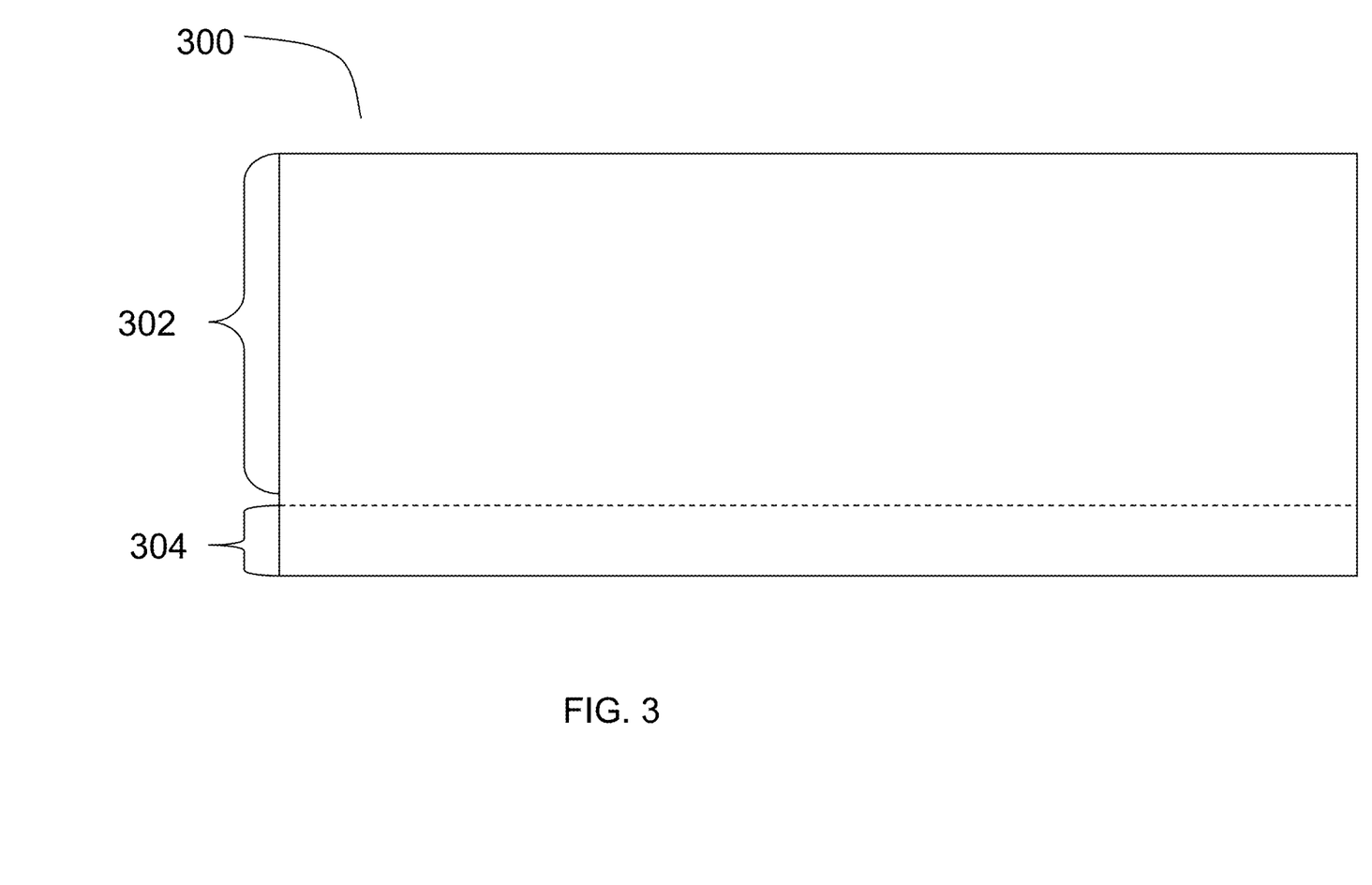
FIG. 3 illustrates an exemplary electrode sheet, according to an embodiment of the disclosure.

FIG. 3 illustrates an exemplary electrode 300, including an electrode coating portion 302 and an electrode extension portion 304. The electrode extension 304 is an extension of the foil substrate of the electrode 300 beyond the electrode coating portion 302. Typically, the electrode extension 304 extends about 20 mm. However, the electrode extension 304 can extend between about 10 mm to about 30 mm beyond the electrode coating portion 302. Because the electrode extension 304 is an extension of foil from the electrode 300, there is no weld between the electrode coating portion 302 and the electrode extension 304. Therefore, the electrode extension portion 304 is integral to the electrode 300. The electrode 300 can be either an anode or a cathode for use in a jelly roll cell. Typically, the extension material for anode is copper, while the extension material for the cathode is aluminum.

Figure 4:
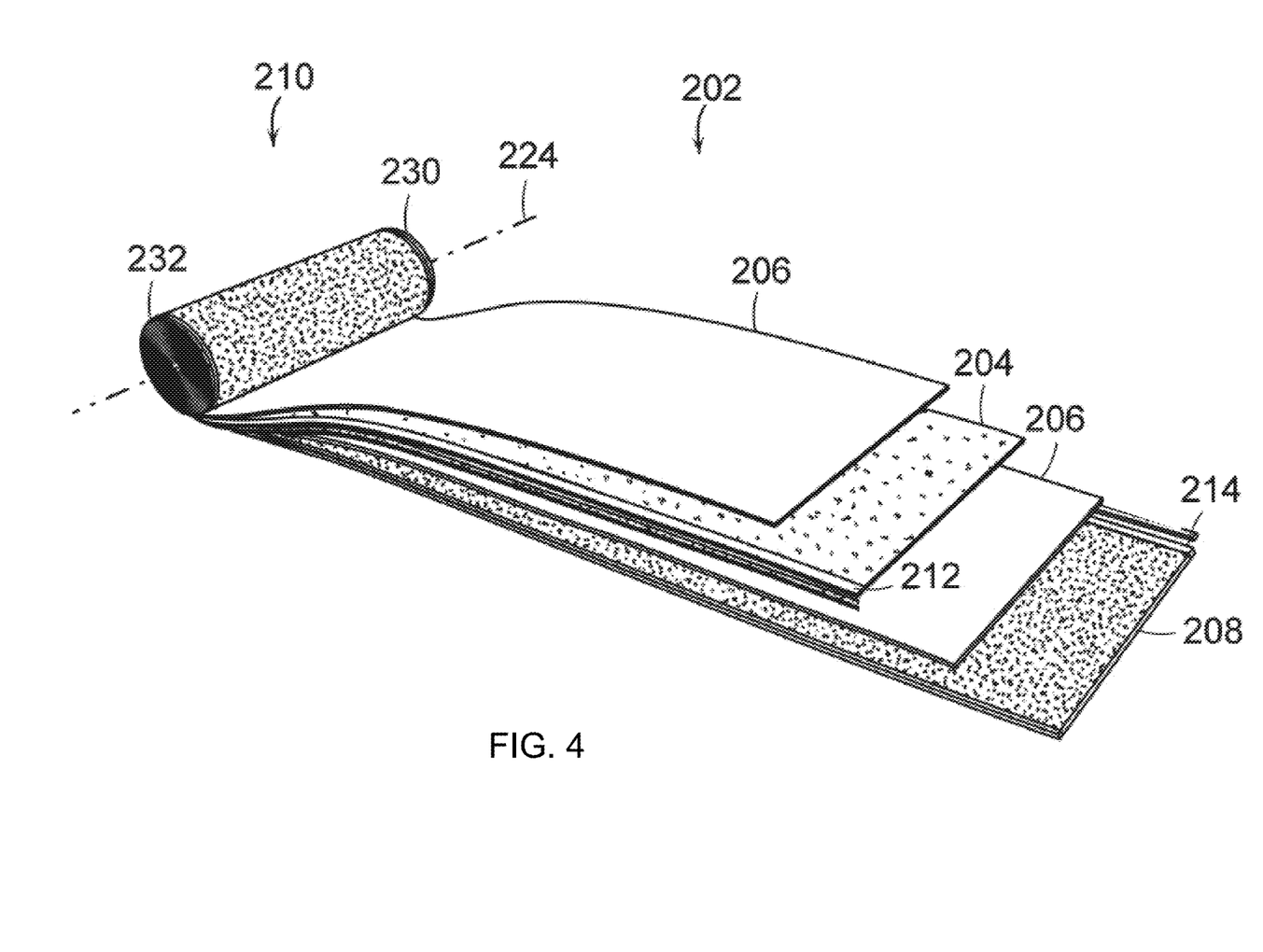
FIG. 4 illustrates a view of a portion of an electrochemical storage (battery) pre-stage to the claimed devices according to an embodiment of the present disclosure.

FIG. 4 illustrates a view of a portion of an electro-chemical storage (battery) device 200. The device is shown partially rolled 210 and partially unrolled 202 for clarity. The rolled portion 210 is formed of sheet or ribbon-shaped elements 202. Alternating sheets of cathodes 204 and anodes 208 are separated by separator membrane sheets 206. Apparatus 200 of FIG. 4 includes a single cathode 204 and a single anode 208. In other embodiments, however, the apparatus 200 may include several cathodes 204 and anodes 208. Anode 208 comprises a layer of electroactive material disposed on an electrically conductive substrate, e.g., a current collector. Materials that are conventionally used in forming an anode layer of a Li-ion battery may be used in the present design, for example, aluminum. As discussed above, each anode 208 includes an anode extension 214 that extends from the active portion of the anode 208. The anode extension 214 is integral to the anode 208, as shown in FIG. 3. The anode extension portion 214 is conductive and provides a way for electrical and thermal coupling to anode 208. Each cathode 204 also similarly includes a cathode extension 212 that extends from the active portion of the cathode 204. Cathode extension 212 is integral to the cathode 204, as shown in FIG. 3. Cathode 204 comprises a layer of electroactive material disposed on an electrically conductive substrate. Materials that are conventionally used in forming a cathode layer of a Li-ion battery may be used in the present design, for example, aluminum. The anode extensions 214 and cathode extensions 212 are at opposite ends of the battery apparatus 200. Separator membranes 206 provide ion conductivity but prevent electronic conduction as discussed above.

The anode 208, cathode 204, and separator sheets 206, including the anode extensions 214, cathode extensions 212, are wound together around central axis 224 to form the rolled structure 210. Any winding or stacking or layering method or design may be employed to construct the battery cell. The rolled structure 210 of FIG. 4 is wound about the central axis 224. Therefore, each of the sheet-shaped materials forms a spiral (as viewed in the cross-section) about the same central axis 224.

Note that the notion of co-winding the sheet should be liberally construed. That is, one or more layers of sheet or sheet-like materials are wound together onto a spool or about one another to result in a spiral configuration of each material, within which the other materials are interspersed. Also, being coiled, rolled, or wound about axis 224 is not meant to imply that the layers form precise circular layers about axis 224. Other rolling or stacking structures are contemplated. In some embodiments the roll forms an increasing-radius spiral rather than constant-radius circular rings.

Figure 5:
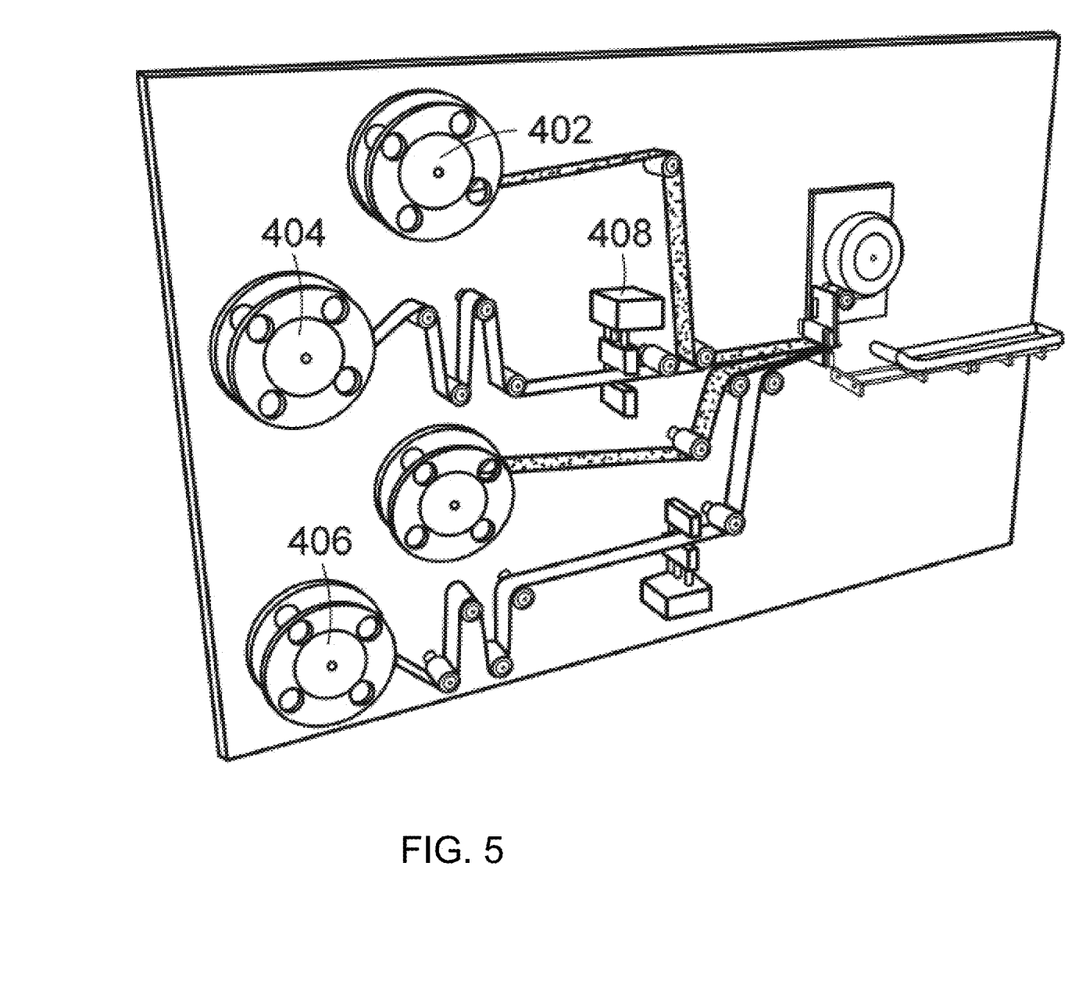
FIG. 5 illustrates one way to co-wind the ribbon-shaped materials to produce the structure of FIG. 4, according to an embodiment of the present disclosure.

FIG. 5 illustrates one way to co-wind the ribbon-shaped materials to produce the structure of FIG. 4. Generally, rolls of each of the constituent materials are spooled at the appropriate feed rates and co-wound into the rolled battery structure described above. The anode, cathode, and separator materials may be provided from spools 404, 406, and 402, respectively.

Figure 6:
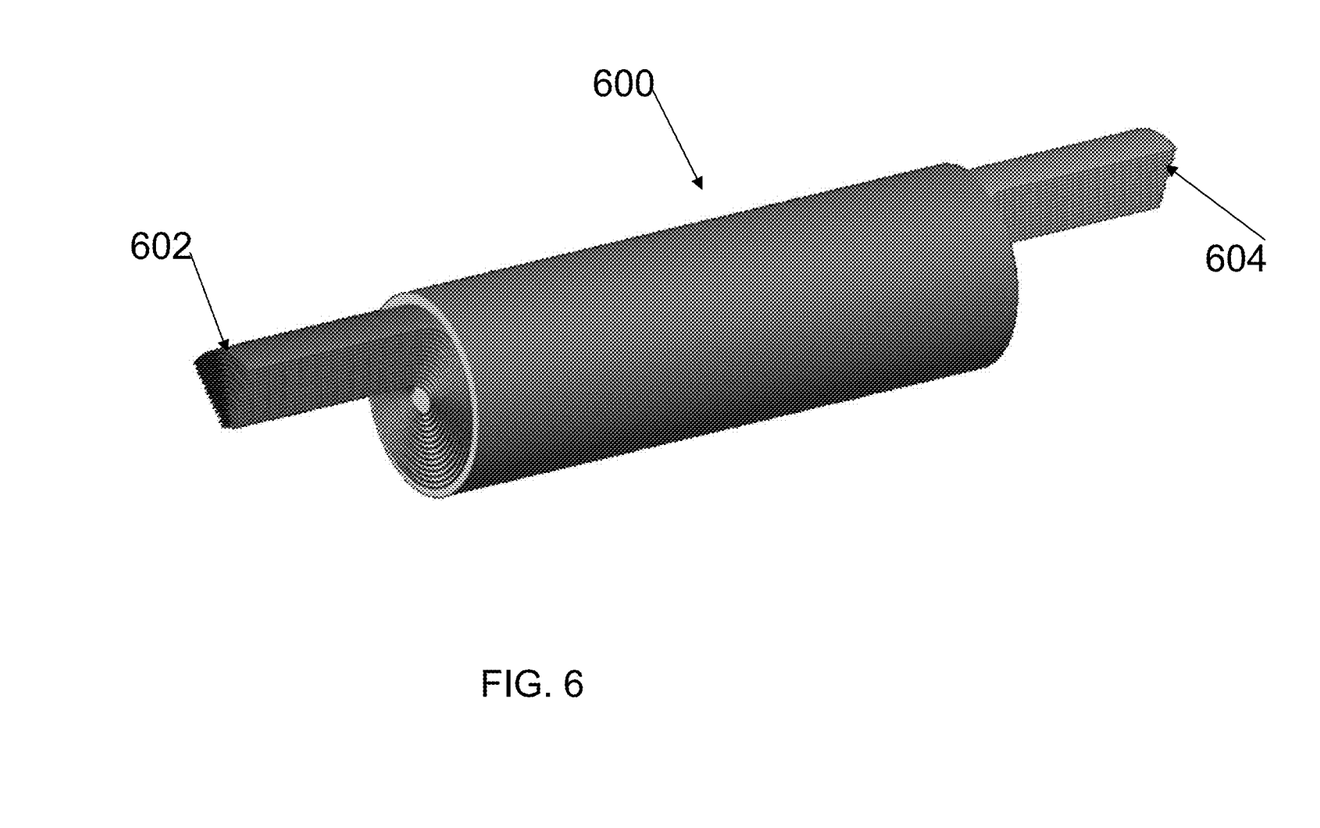
FIG. 6 depicts a cut jelly roll cell, according to embodiments of the disclosure.
Figure 7A:
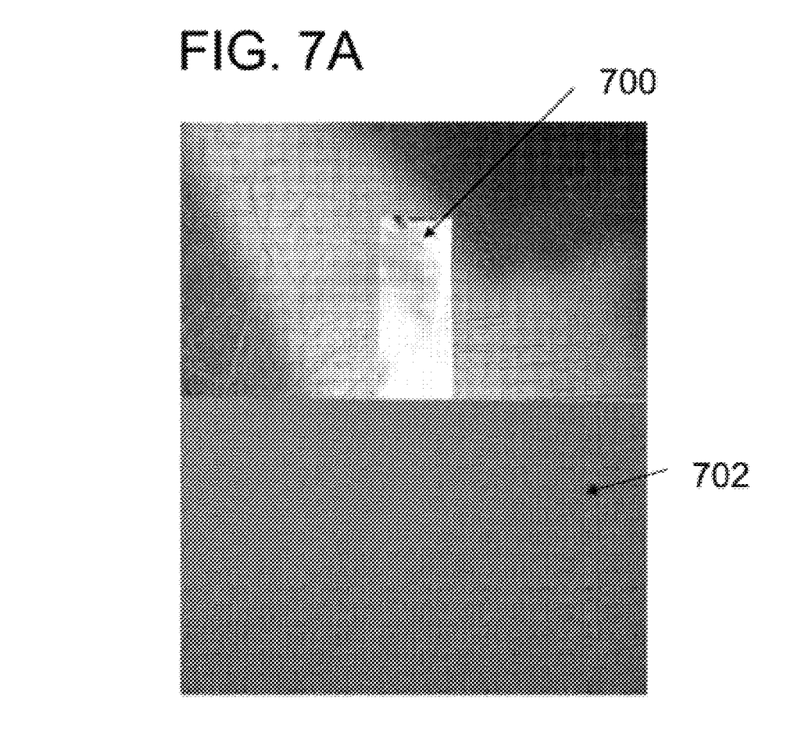
FIG. 7A depicts a tab made according embodiments of the present disclosure.

Once the jelly roll is formed, each of the anode and cathode extensions can be cut to form conducting electrode tabs. FIG. 6 depicts a cut jelly roll 600, according to embodiments of the disclosure. Jelly roll 600 has a plurality of cathode tabs 602 and a plurality of anode tabs 604 such that each winding of the jelly roll 600 has each of a cathode tab and an anode tab and each tab is integral to either the cathode or the anode, i.e., the tabs are not welded to the cathode or anode. The size and shape of the final cut tabs can vary based on the final cell design. For a low weight, low impedance cell, the tabs can be about 3 mm to about 4 mm wide. For a higher power application, the tabs can be about 8 mm wide. The tabs also can have varying cross sections. For example, for some applications, the tabs can have a generally triangular profile, as shown in FIG. 6, while for other applications the tabs can have a square profile, as shown in FIG. 7A. Further, the lengths of the tabs depend on the diameter of the cell. For example, cells with a large diameter have longer tabs, while tabs with a smaller diameter have smaller tabs. In some embodiments, the length of the tabs can increase in size as the tab's distance from the center of the cell increases. That is, shorter tabs are in the center of the cell, while longer tabs are on the edges of the cell. Typically, the tabs can range in length between about 8 mm and about 25 mm.

Figure 7B:
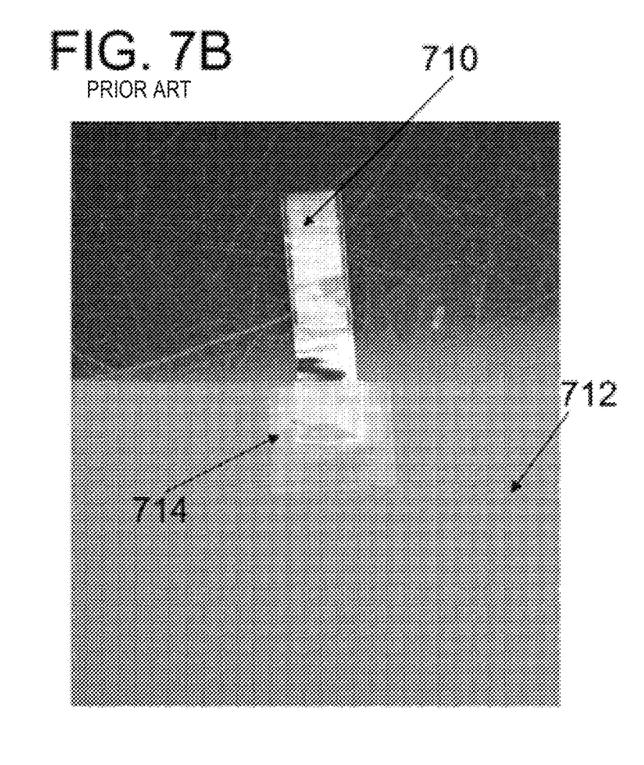
FIG. 7B depicts a tab made according to conventional welding practices.

FIG. 7A depicts a tab made according embodiments of the present disclosure. Tab 700 is cut out from one continuous piece of foil extending from electrode region 702. Tab 700 has no weld joint to the electrode 702 and is integral to the electrode 700. FIG. 7B depicts a tab 710 made according to conventional welding practices. Tab 710 is welded to electrode 712. Thus, a weld joint 714 is present between the tab 710 and the electrode 712.

Figure 8:
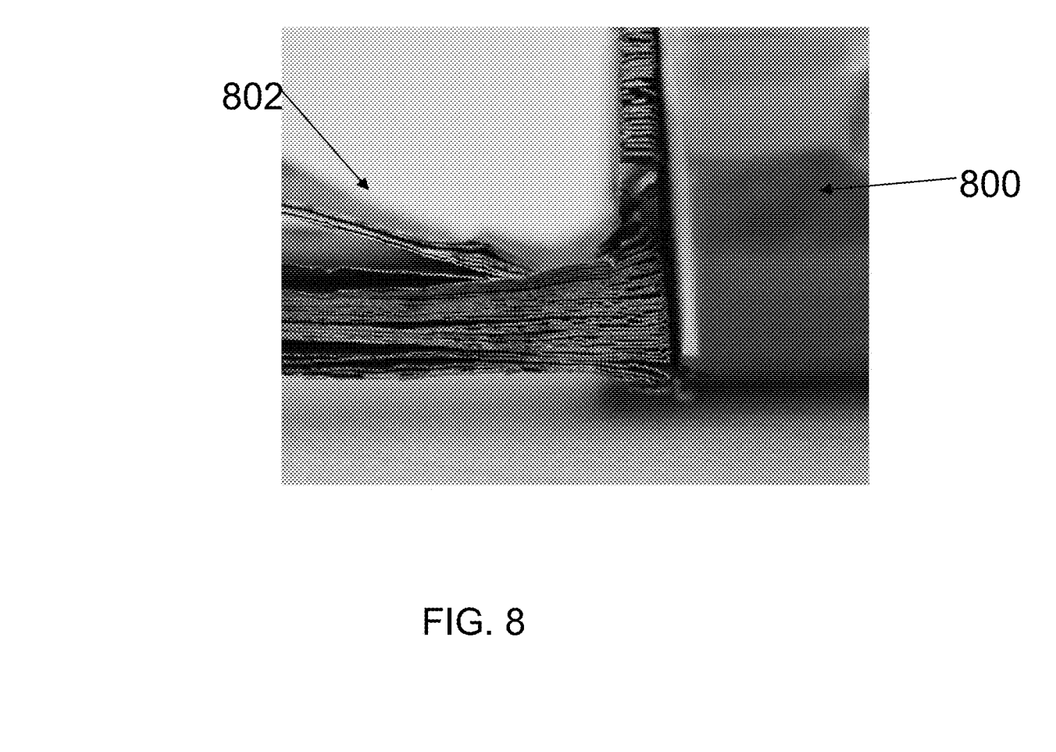
FIG. 8 depicts a cell having a plurality of weld free extension tabs made according embodiments of the present disclosure.

The integral tab can be made by cutting the foil extension into tabs of the desired shape after the anode and cathode sheets have been assembled into an electrochemical cell. The disclosed cutting process (1) produces little to no debris, (2) leaves behind a clean edge, (3) is scalable to a mass manufacturing operation, and (4) produces anode and cathode tabs within 90 degrees of each other. This last requirement refers to the tab alignment in the jellyroll after a cell has been wound. Preferably, all tabs are be aligned, i.e., the tabs lie within a 90 degree area measured from the center of the two furthest tabs. Therefore, all the anode tabs are within 90 degrees of each other and all the cathode tabs are within 90 of each other. The preferred alignment for this process would be +/−5 degrees from the center of the two furthest tabs, i.e., the tabs are within 10 degrees of each other. For example, the alignment could be +/−5 degrees from the center of the two furthest cathode tabs and +/−5 degrees from the center of the two furthest anode tabs. An ultrasonic cutting process has been used to satisfy the above process limitations. Ultrasonic cutting machines vibrate a cutting tool or horn, for example, knife or blade, at a high frequency. The ultrasonic blade uses vertical oscillations to ease blade passage through typically hard to cut materials. The blade, when vibrating at high frequency, disrupts the air molecules around it and creates a nearly frictionless environment between the blade and the material being cut. As a result, very little normal pressure is needed to make a clean, accurate cut and blade life is excellent. A Sonics & Materials (Newtown, Conn.) ultrasonic cutting tool was used to make extremely precise cuts without any crushing of the bare foil ends of the disclosed jelly roll, despite the fact that the aluminum and copper foils used in battery manufactures are extremely malleable. FIG. 8 depicts a cell 800 having a plurality of weld free extension tabs 802 cut with an ultrasonic cutting tool from Sonics & Materials. As shown in FIG. 8, the edges left behind were clean and very little debris was produced during cutting. The cuts were made with a blade with a double beveled edge, initially designed for cutting tires, and the jelly roll was hand held. A blade with a single beveled edge could be used as well. Other cutting techniques capable of cutting through foils without producing debris that leave behind a clean edge, and are scalable also can be used. While FIG. 8 shows the cutting blade leaving edges of foil while removing the majority of the foil, for production, all of the foil up to the electrode coated area would be removed.

Figure 9:
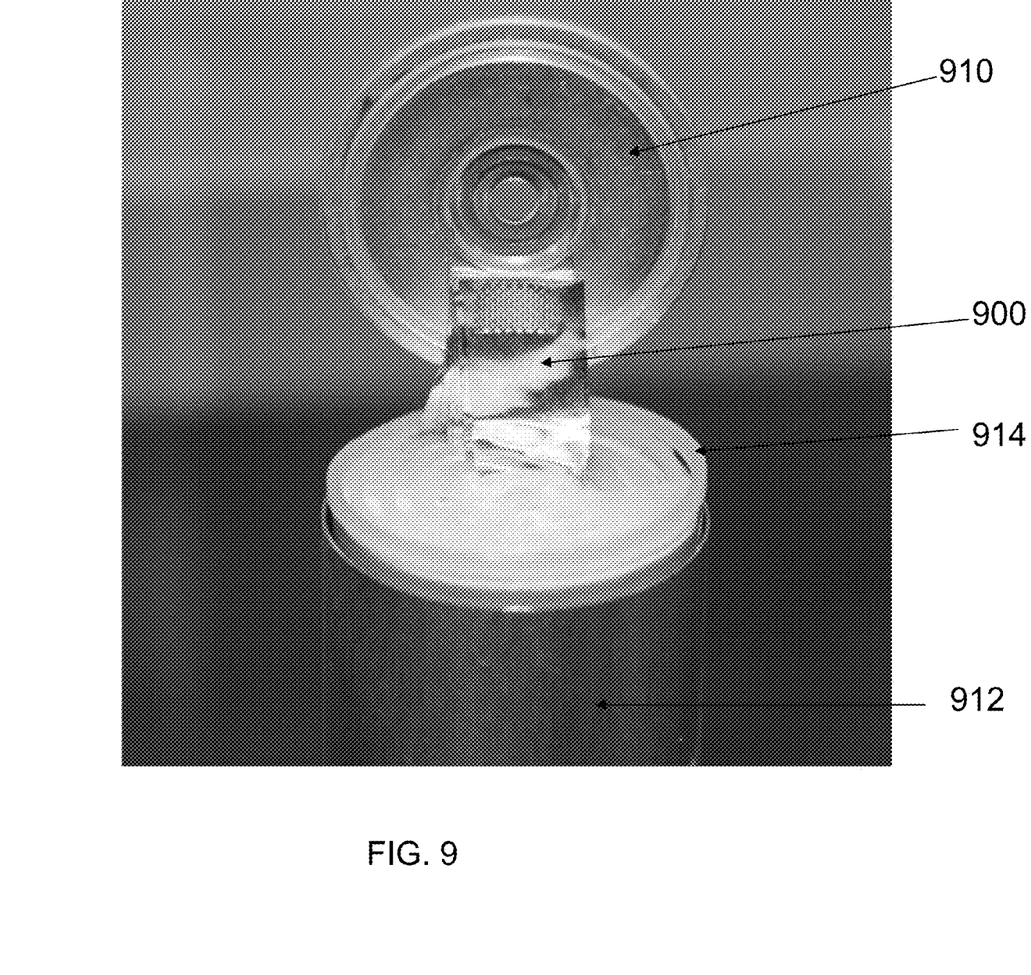
FIG. 9 depicts a cell being placed into a can, according embodiments of the present disclosure.

FIG. 9 depicts a cell being placed into a can. After the tabs 900 have been cut, the tabs are then coupled to a cover 910. Cover 910 has a conductive center terminal that is used to connect the battery to an external electrical circuit. The cover 910 further includes an insulating ring 914 disposed around the center terminal. Once assembled, an electrically conductive pathway exists between the tabs and therefore the electrode connected to those tabs of the rolled assembly and the center terminal of the cover 910. The rolled assembly is then inserted into the conductive can 912 and a second cover (not shown) is coupled to both the second set of tabs (at the other electrode) and the can 912. Electrolyte can be introduced into the interior volume that is defined by the can 912 and the cover 910 via a port (not shown) once the cover 910 has been attached to the can 912. The port is plugged after the volume has been sufficiently filled. The port can be provided in the cover 910 or, alternatively, in the can 912. Alternatively, the electrolyte can be introduced into the interior volume of the can prior to attaching the cover 912.

Electrolytic filler fluids and gels may be inserted into the battery roll once formed by known techniques, such as vacuum back-filling. One way in which the battery roll may be filled also allows for gas exchange during charging and discharging of the battery.

Figure 10:
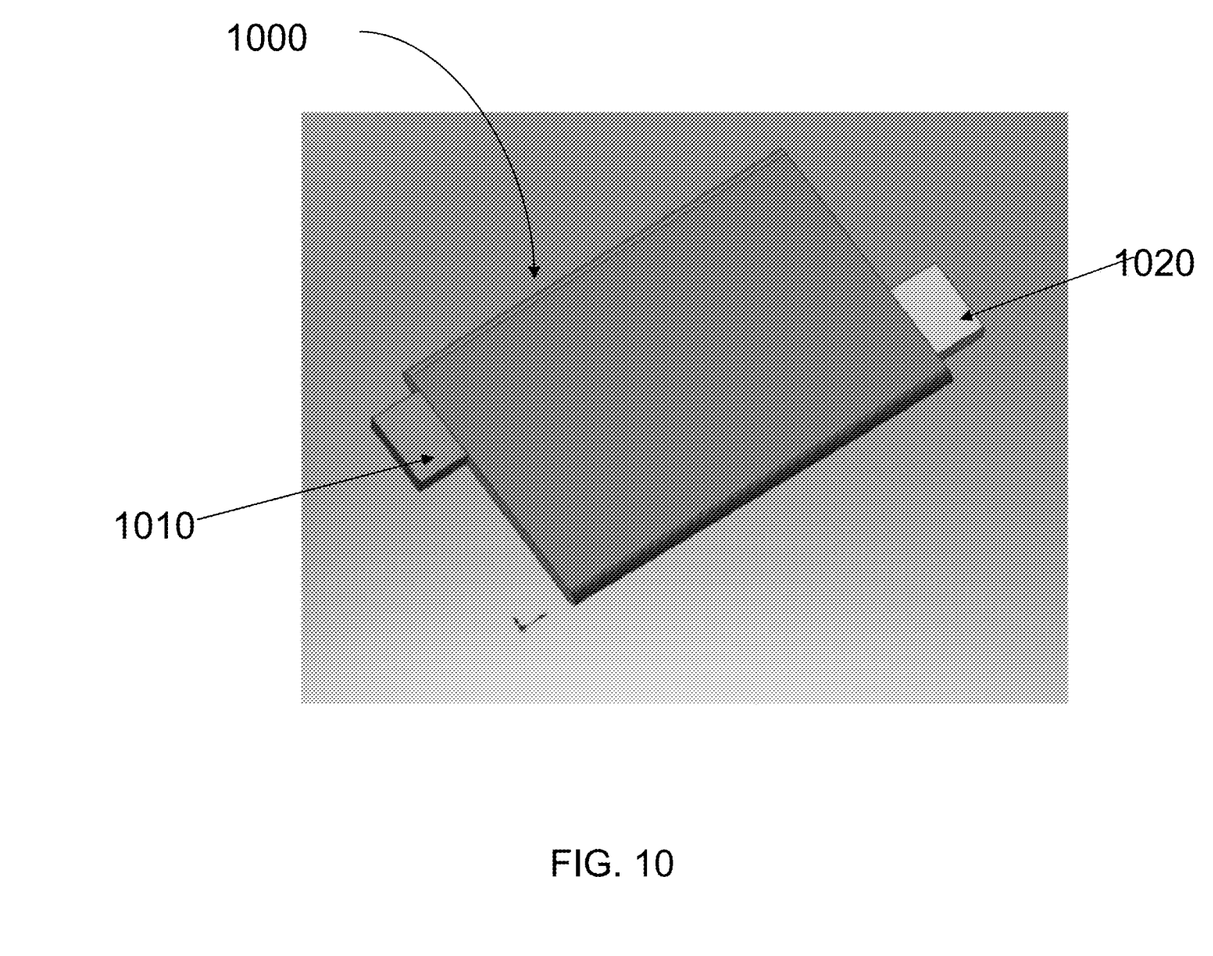
FIG. 10 depicts a wound prismatic cell 1000 having integral battery tabs 1010, 1020 according to embodiments of the present disclosure.

The disclosed integral battery tab also can be used in wound prismatic cells. FIG. 10 depicts a wound prismatic cell 1000 having integral battery tabs 1010, 1020 according to embodiments of the present disclosure. A wound prismatic cell is cell that is manufactured by winding anode, cathode, and separator around a flat plate resulting in a flat cell having a prismatic profile. As with other wound cells discussed above, current collector tabs typically are welded to the electrode prior to winding. The same manufacturing issues are present with a wound prismatic cell as a cylindrical cell. Tabs can be aligned within a certain tolerance for proper connection to the external pouch or can. By extending uncoated aluminum and copper foil out each end of the cell (as discussed above with the jelly roll cylindrical cell), a cutting process can be used to remove the unwanted foil leaving a strip of current collector tabs in the desired location. As discussed above, this removes the need to clean electrodes, ultrasonically weld current collector tabs to foil, and engineering complex tab alignment formulas to account for the winding process. In addition, lot yield, overall cell quality, and cell performance are improved, and manufacturing costs are reduced.

While traditional battery designs currently struggle to provide high power applications with the desired results, the embodiments described herein allow for a reduced impedance design that provide improved electrical characteristics for high power and high current applications. Lower resistance of the battery cell internals and tabs also reduces heat generation and dissipation from the battery. The tabs described provide a good heat sink to the outer battery components and prevent undesired thermal buildup in the battery.

Upon review of the present description and embodiments, those skilled in the art will recognize useful modifications and equivalent substitutions of various aspects of the present disclosure without departing from the scope of the invention.

Thus, the scoped of the invention is not limited to the specific embodiments that are discussed above.

What is claimed is:

1. A wound electromechanical storage device assembly comprising:
   a negative electrode sheet;
   a plurality of negative electrode tabs which are integral to and extend from the negative electrode sheet, the negative electrode tabs cut from the wound assembly around a common axis;
   a positive electrode sheet;
   a plurality of positive electrode tabs which are integral to and extend from the positive electrode sheet, the positive electrode tabs cut from the wound assembly around the common axis;
   a separator sheet disposed between the negative and positive electrode sheets,
   wherein the negative electrode sheet, positive electrode sheet, and separator sheet are wound around the common axis to form a plurality of windings,
   wherein each winding comprises one negative electrode tab and one positive electrode tab; and
   wherein the negative electrode tabs and the positive electrode tabs are arranged at opposite ends of the common axis.

2. The device of claim 1, wherein each of the plurality of negative electrode tabs and the plurality of positive electrode tabs are aligned.

3. The device of claim 1, wherein the negative electrode sheet and the negative electrode tabs are both comprised of copper.

4. The device of claim 1, wherein the positive electrode sheet and the positive electrode tabs are both comprised of aluminum.

5. The device of claim 1, wherein the plurality of windings are substantially concentric windings having a substantially cylindrical profile.

6. The device of claim 1, wherein the plurality of windings are substantially concentric windings having a substantially prismatic profile.

7. The device of claim 1, wherein each tab has a width of about three mm to about eight mm.

8. The device of claim 1, wherein each tab has a length of about eight mm to about 25 mm.

9. The device of claim 1, wherein each of the tabs is substantially free of electrode active material.

10. The device of claim 1, wherein each of the tabs has a triangular profile.

11. The device of claim 1, wherein each of the tabs has a rectangular profile.

12. A method of manufacturing an electrochemical storage device, comprising the steps of:
    arranging a separator sheet between a negative electrode sheet and a positive electrode sheet, wherein each of the positive and negative electrode sheets has an edge area which is substantially free of electrode active material;
    winding the negative electrode sheet, separator sheet, and positive electrode sheet about a common axis to form a wound assembly wherein the edge of the positive electrode sheet and the edge of the negative electrode sheet are at opposite ends of the common axis; and
    cutting each of the edge areas from the wound assembly to form a plurality of electrode tabs wherein each winding of the wound assembly comprises one tab for each of the negative electrode sheet and the positive electrode sheet.

13. The method of claim 12, wherein cutting comprises ultrasonic cutting.

14. The method of claim 12, wherein the plurality of electrode tabs are aligned.

15. The method of claim 12, wherein each tab has a width of about three mm to about eight mm.

16. The method of claim 12, wherein each tab has a length of about eight mm to about 25 mm.

17. The method of claim 12, wherein each of the edge areas has a width of about 10 mm to about 30 mm.

18. The method of claim 12, wherein each of the edge areas has a width of about 20 mm.

19. The method of claim 12, wherein each of the tabs has a triangular profile.

20. The method of claim 12, wherein each of the tabs has a rectangular profile.

21. The method of claim 12, wherein the wound assembly has a cylindrical profile.

22. The method of claim 12, wherein the wound assembly has a prismatic profile.

* * * * *